US006708271B1

United States Patent
(12) United States Patent
Sasaki et al.

(10) Patent No.: US 6,708,271 B1
(45) Date of Patent: Mar. 16, 2004

(54) INTERACTIVE MULTI-MODULE SYSTEM HAVING A COMMUNICATION MANAGER FOR ACHIEVING LINKED OPERATION OF PLURALITY OF MODULES AND FOR DEFINING WHETHER AND HOW AN INDIVIDUAL MODULE CAN ACCESS A PARTICULAR FUNCTION

(75) Inventors: Mikio Sasaki, Kariya (JP); Katsushi Asami, Soraku-gun (JP); Kenzo Ito, Okazaki (JP); Satoshi Hirose, Nagoya (JP); Noriaki Takemoto, Nagoya (JP)

(73) Assignee: Denso Corporation, Kariya (JP)

( * ) Notice: Subject to any disclaimer, the term of this patent is extended or adjusted under 35 U.S.C. 154(b) by 519 days.

(21) Appl. No.: 09/633,144

(22) Filed: Aug. 4, 2000

(30) Foreign Application Priority Data

Aug. 18, 1999 (JP) .......................................... 11-231528

(51) Int. Cl.[7] .......................................... G06F 9/00
(52) U.S. Cl. .......................... 713/1; 709/328; 709/329
(58) Field of Search .................... 713/1, 100; 709/100, 709/107, 310, 328, 329

(56) References Cited

U.S. PATENT DOCUMENTS

| | | | | |
|---|---|---|---|---|
| 4,785,408 A | * | 11/1988 | Britton et al. | 704/270 |
| 5,452,449 A | * | 9/1995 | Baldwin et al. | 707/102 |
| 5,958,019 A | | 9/1999 | Hagersten et al. | |
| 6,029,188 A | * | 2/2000 | Uyama | 709/102 |
| 6,237,045 B1 | * | 5/2001 | Enomoto | 709/328 |
| 6,292,188 B1 | * | 9/2001 | Carlson et al. | 345/854 |
| 6,560,606 B1 | * | 5/2003 | Young | 707/100 |

FOREIGN PATENT DOCUMENTS

| | | | | |
|---|---|---|---|---|
| EP | 0 817 030 A2 | | 1/1998 | |
| JP | 05282160 A | * | 10/1993 | G06F/9/455 |
| JP | 09159470 A | * | 6/1997 | G01C/21/00 |
| JP | 09185540 | | 7/1997 | |
| JP | 10-3392 | | 1/1998 | |
| JP | 11-15680 | | 1/1999 | |

OTHER PUBLICATIONS

Hu et al, Optimal Bipartite Multi–processor Implementation of Recurrent DSP Algorithm with Fixed Communication Delay, Nov. 1998, IEEE, vol. 2, pp. 1230–1234.*

U.S. patent application Ser. No. 09/328,339, Sasaki, filed Jun. 9, 1999.

U.S. patent application Ser. No. 09/605,68, Sasaki, filed Jun. 27, 2000.

U.S. patent application Ser. No. 09/490,442, Sasaki, filed Jan. 24, 2000.

U.S. patent application Ser. No. 09/650,688, Sasaki, filed Jun. 27, 2000.

* cited by examiner

*Primary Examiner*—Dennis M. Butler
*Assistant Examiner*—Suresh K Suryawanshi
(74) *Attorney, Agent, or Firm*—Posz & Bethards, PLC

(57) ABSTRACT

In a multi-module system, information required for linked operation of a plurality of modules is stored in a communication manager as profiles written in a specific format. The modules operate by referring to these profiles, and update the profiles as appropriate. The modules thereafter operate based on the updated profiles, and appropriately updates the profiles. The communication manager thus enables the linked operation among the modules based on continuously updated profiles.

11 Claims, 11 Drawing Sheets

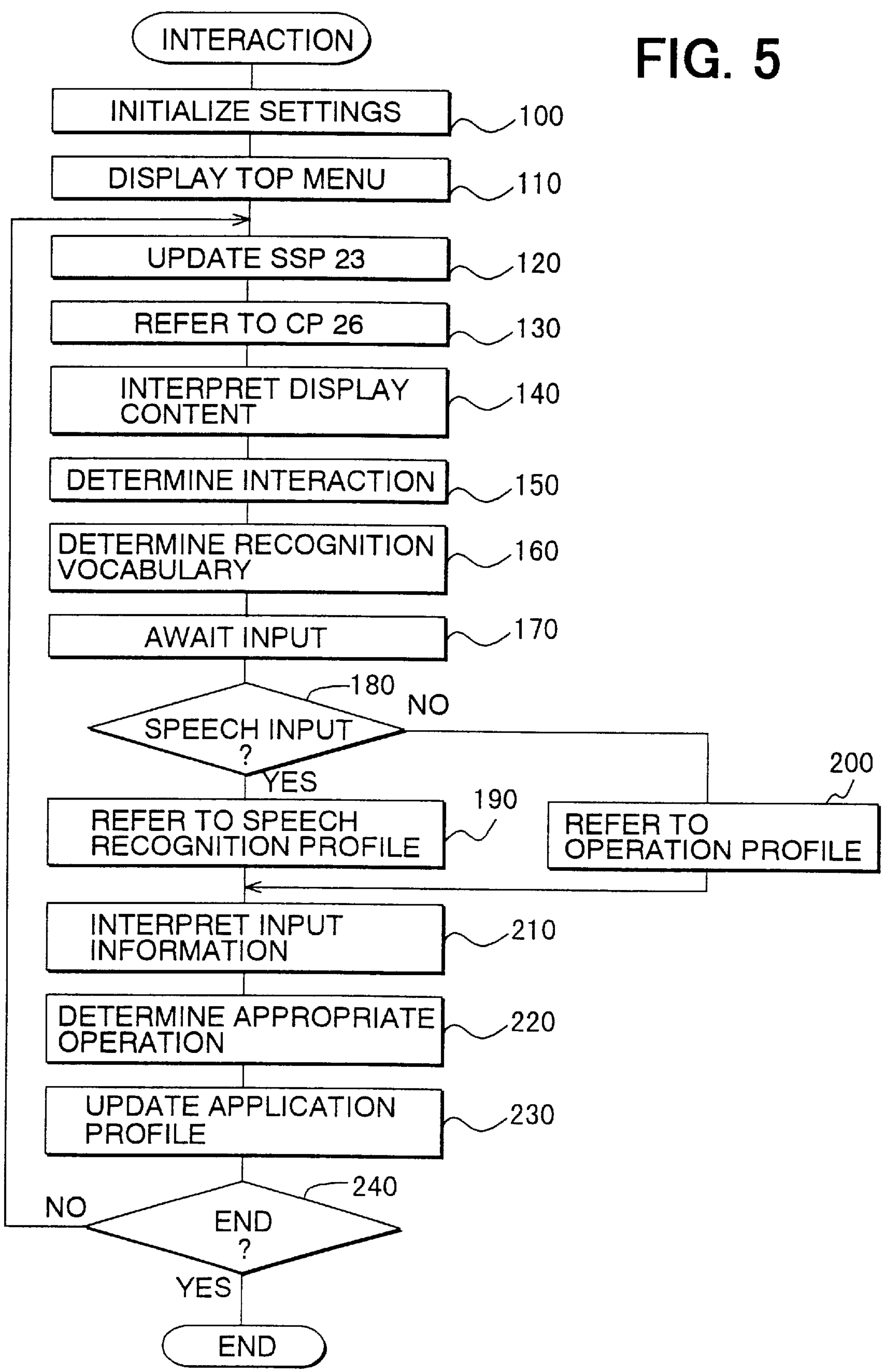
FIG. 5
INTERACTION
INITIALIZE SETTINGS
100
DISPLAY TOP MENU
110
UPDATE SSP 23
120
REFER TO CP 26
130
INTERPRET DISPLAY CONTENT
140
DETERMINE INTERACTION
150
DETERMINE RECOGNITION VOCABULARY
160
AWAIT INPUT
170
180
SPEECH INPUT ?
NO
YES
REFER TO SPEECH RECOGNITION PROFILE
190
200
REFER TO OPERATION PROFILE
INTERPRET INPUT INFORMATION
210
DETERMINE APPROPRIATE OPERATION
220
UPDATE APPLICATION PROFILE
230
240
END ?
NO
YES
END

FIG. 10

SPEECH RECOGNITION PROFILE (SRP) 22

| OBJECT TYPE | OBJECT NAME | SETTING |
|---|---|---|
| Family name | FamilyName | |
| Member name | MemberName | |
| Major class | MajorClass | profile |
| Middle class | MiddleClass | voice |
| Minor class | MinorClass | SPRECOG |
| Attribute No. | AttributeNumber | number of attributes |
| Attribute 1 | ControlParameter | control parameter |
| Attribute 2 | ExeStatus | execution status |
| Attribute 3 | RequestCode | request code |
| Attribute 4 | UtteranceTime | speaking time |
| Attribute 5 | FinMsgNumber | final message number |
| Attribute 6 | FinishCode | final code |
| Attribute 7 | DictNum | number of dictionaries |
| Attribute 8 | Dictionary1 | fixed dictionary 1 |
| Attribute 9 | Dictionary2 | fixed dictionary 2 |
| Attribute 10 | Dictionary3 | fixed dictionary 3 |
| Attribute 11 | ... | ... |
| Attribute 12 | UserDictNum | no. of user dictionaries |
| Attribute 13 | UserDict1 | user dictionary 1 |
| Attribute 14 | UserDict2 | user dictionary 2 |
| Attribute 15 | ... | ... |
| Attribute 16 | MemorySize | output memory size |
| Attribute 17 | RecogNumber | no. of recognition results |
| Attribute 18 | RecogResult1 | recognition result 1 |
| Attribute 19 | RecogResult2 | recognition result 2 |
| Attribute 20 | RecogResult3 | recognition result 3 |
| Attribute 21 | ... | ... |
| Attribute 22 | MicGain | microphone gain |
| Attribute 23 | ExtractedPeriod | recognized period |
| ... | ... | ... |

HEADER

--> From Attribute 7 onward: operation attributes

FIG. 11

SPEECH SYNTHESIS PROFILE (SSP) 23

| OBJECT TYPE | OBJECT NAME | SETTING |
|---|---|---|
| Family name | FamilyName | |
| Member name | MemberName | |
| Major class | MajorClass | Profile |
| Middle class | MiddleClass | voice |
| Minor class | MinorClass | SPSYNTHE |
| Attribute No. | AttributeNumber | number of attributes |
| Attribute 1 | ControlParameter | control parameter |
| Attribute 2 | ExeStatus | execution status |
| Attribute 3 | RequestCode | request code |
| Attribute 4 | Reserved | (undefined) |
| Attribute 5 | FinMsgNumber | final message number |
| Attribute 6 | FinishCode | final code |
| Attribute 7 | Reserved | (undefined) |
| Attribute 8 | Character | name of voice character |
| Attribute 9 | Speed | rate of speech |
| Attribute 10 | Volume | volume of voice |
| Attribute 11 | Intonation | intonation number |
| Attribute 12 | Tone | tone |
| Attribute 13 | SpeechText | spoken text |
| Attribute 14 | Adpcm | ADPCM voice |
| ... | ... | ... |

HEADER

--> From Attribute 7 onward: operation attributes

FIG. 12

SWITCH PROFILE (SWP) 24

| OBJECT TYPE | OBJECT NAME | SETTING |
|---|---|---|
| Family name | FamilyName | |
| Member name | MemberName | |
| Major class | MajorClass | Profile |
| Middle class | MiddleClass | Operating system |
| Minor class | MinorClass | remote control |
| Attribute No. | AttributeNumber | number of attributes |
| Attribute 1 | OperationMode | Operating mode |
| Attribute 2 | OperationObject | Operation object |
| Attribute 3 | KeyNumber | number of keys |
| Attribute 4 | KeyEvents | key event string |
| ... | ... | ... |

HEADER

--> From Attribute No. onward: operation attributes

FIG. 13

APPLICATION PROFILE (AP) 25

| OBJECT TYPE | OBJECT NAME | SETTING |
|---|---|---|
| Family name | FamilyName | |
| Member name | MemberName | |
| Major class | MajorClass | profile |
| Middle class | MiddleClass | voice |
| Minor class | MinorClass | S-DISP |
| Attribute No. | AttributeNumber | number of attributes |
| Attribute 1 | DisplayA | file name |
| Attribute 2 | DisplayB | file name |
| Attribute 3 | DisplayC | file name |
| Attribute 4 | DisplayAreaA | display position |
| Attribute 5 | DisplayAreaB | display position |
| Attribute 6 | DisplayAreaC | display position |
| Attribute 7 | DayNight | true/false |
| Attribute 8 | AP-Command | AP command |
| ... | ... | ... |
| Attribute 9 | AP-ParamNum | no. of parameters |
| Attribute 10 | AP-ParamD1 | parameter |
| Attribute 11 | AP-ParamD2 | parameter |
| ... | ... | ... |

HEADER

--> From Attribute No. onward: operation attributes

FIG. 14

CONTENTS PROFILE (CP) 26

| OBJECT TYPE | OBJECT NAME | SETTING |
|---|---|---|
| Family name | FamilyName | |
| Member name | MemberName | |
| Major class | MajorClass | profile |
| Middle class | MiddleClass | |
| Minor class | MinorClass | |
| Attribute No. | AttributeNumber | number of attributes |
| Attribute 1 | DisplayA | file name |
| Attribute 2 | DisplayB | file name |
| Attribute 3 | DisplayC | file name |
| Attribute 4 | DrawConditionA | 0, 1, or 2 |
| Attribute 5 | DrawConditionB | 0, 1, or 2 |
| Attribute 6 | DrawConditionC | 0, 1, or 2 |
| Attribute 7 | AP-AttrNumC | no. of display items |
| Attribute 8 | AP-AttrNumD | no. of display items |
| Attribute 9 | AP-SelectItemC | selected item text string |
| Attribute 10 | AP-SelectItemD | selected item text string |
| Attribute 11 | AP-ItemC1 | item text string |
| Attribute 12 | ... | ... |
| Attribute 13 | AP-ItemD1 | item text string |
| ... | ... | ... |

HEADER (Family name through Minor class)

--> From Attribute No. onward: operation attributes

INTERACTIVE MULTI-MODULE SYSTEM HAVING A COMMUNICATION MANAGER FOR ACHIEVING LINKED OPERATION OF PLURALITY OF MODULES AND FOR DEFINING WHETHER AND HOW AN INDIVIDUAL MODULE CAN ACCESS A PARTICULAR FUNCTION

CROSS REFERENCE TO RELATED APPLICATION

This application relates to and incorporates herein by reference Japanese Patent Application No. 11-231528 filed on Aug. 18, 1999.

BACKGROUND OF THE INVENTION

The present invention relates to a multi-module system having a plurality of process modules as processing units for achieving particular functions, and a communication manager provided among and enabling linked operation of the plurality of modules.

Various types of human-machine interfaces (HMI) enabling a user to interact with a machine of some type to access and exchange information have been in use for many years. Interfaces enabling more intuitive or natural interaction have also been developed recently. Examples of these are the interactive man-machine interface (MMI) now available on some motor vehicle navigation systems. For example, when the user requests a typical interactive navigation system to display a road map, a task that can be accomplished by pressing a button or speaking to the system, the navigation system responds by asking the user for the desired location in the map to be displayed. If the user then indicates the current location, for example, the navigation system displays a map of the area surrounding the current location on the display.

Some of the functions that are required in this interactive navigation system include speech recognition for recognizing and interpreting the content spoken by the user, a speech synthesis or generation function for speaking to the user, a key detection function for recognizing what keys or buttons the user operates, an interaction manager for responding naturally to the user, and a display function for actually displaying a map or other information to the user. The program controlling this interactive system is generally written with separate modules for the various functions.

A "module" is defined as a programmed unit for processing and handling a specific function. A module can also be thought of as a device having a CPU for running the processing program rather than as the processing program itself. In this case, a module can be considered a hardware unit. It can even be a product including a computer system. On the other hand, if the overall system includes a CPU, for example, and uses the CPU to run the processing program, the module is conceptually a unit of software.

Certain expressions used herein are also specifically defined. Specifically, expressions such as "the module does something)" where the module is the subject of the predicate means that a CPU in the module or the system runs the processing program of the particular module. In addition, "the module operates" and similar expressions mean that the processing program of the module is run by the CPU.

In JP-A-10-3392, JP-A-11-15680, and JP-A-10-69391, a communication manager provided separately from any module performs a number of communication processes which are normally accomplished in a module. This simplifies the processing program of the module, makes it easier to design the processing program, or enables the communication manager to manage the operation of each module.

However, module design becomes more difficult when designing the module linking operation required for an interactive system is considered, particularly if the linking operation is to achieve natural, intuitive interaction.

For example, in designing a system in which a module A operates according to information from three other modules B, C and D, information from each of the three modules B, C and D is passed separately to the module A through the communication manager. That is, modules B, C and D separately pass information required for the operation of the module A to module A with the three modules communicating with the module A at different times. The processing program of the module A must therefore be designed to accommodate the separate data transmission timing of each of the three modules B, C and D. For example, if data is sent to the module A from each of the modules in the sequence B, C and D, data from the modules B and C must be temporarily stored in a memory until data from the module D is also received. Then the data of the module B and C is read from the memory so that a decision process can be performed using information from all the three modules.

JP-A-11-15680 in particular teaches a technique for controlling each module using a multiple-process manager (communication manager). Designing a processing program of a module is made easier if the operation of each module is centrally managed by this type of communication manager. However, this requires a manager process in the communication manager for considering the data transmission timing from each module. If the overall system is considered, this means that designing the communication manager actually becomes more difficult.

Furthermore, a process that achieves this type of linking operation is dependent upon the processing programs of the other modules, and it is therefore difficult to change a module or add a new module.

It should be noted that these problems are not unique to the human-machine interface of an interactive system, for example, and are confronted when a module linking operation is sought in any module system.

SUMMARY OF THE INVENTION

Therefore, it is an object of the present invention to simplify designing, modifying, and adding modules that are part of the linked operation of plurality of modules.

According to the present invention, a multi-module system comprises a plurality of modules for achieving respective particular functions and a communication manager provided among the plurality of modules for achieving linked operation of the plurality of modules. The communication manager includes a memory, an interface and a processor. The memory stores in a specific format operating information which is defined as profiles necessary for linked operation of the modules. The interface enables access from the plurality of modules. The processor accomplishes, based on a request sent from each module through the interface, a referencing process for reading the stored operating information from the memory and passing the operating information to the module, and an updating process for updating the operating information stored in the memory according to the operating information from the module. Each module requests the communication manager to read the operating information by way of the interface, operates according to the operating information provided from the communication manager in response to a read request, and updates the operating information through the interface. The communication manager thus enables the linked operation among the modules based on continuously updated profiles.

BRIEF DESCRIPTION OF THE DRAWINGS

Other objects and attainments together with a fuller understanding of the invention will become apparent and from the following detailed description made in conjunction with the accompanying drawings, wherein:

FIG. 5 is a flow diagram showing the operation of an interaction manager module in the interactive system;

FIG. 10 is a typical speech recognition profile in the interactive system;

FIG. 11 is a typical speech synthesis profile in the interactive system;

FIG. 12 is a typical user operation profile in the interactive system;

FIG. 13 is a typical application profile in the interactive system; and

FIG. 14 is a typical content profile in the interactive system.

DETAILED DESCRIPTION OF THE PREFERRED EMBODIMENT

The preferred embodiment of the present invention is described below with reference to the accompanying drawings.

Figure 1:
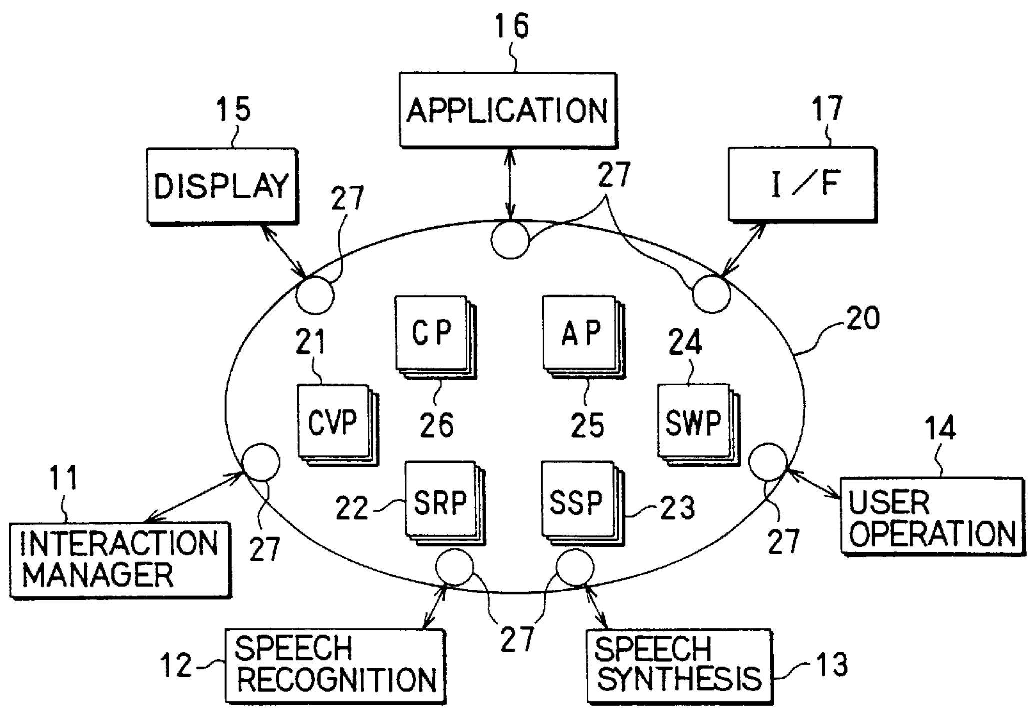
FIG. 1 is a schematic diagrams showing the structure of a software program for an interactive system according to a preferred embodiment of the present invention.

Referring first to FIG. 1 showing a software configuration of an interactive system in an exemplary embodiment of the present invention, this interactive system is constructed as a computer system having a central processing unit (CPU), a read-only memory (ROM), a random access memory (RAM) and an input/output circuit (I/O).

The interactive system in this exemplary embodiment has an interaction manager module 11, a speech recognition module 12, a speech synthesis or generation module 13, a user operation module 14, a display module 15, an application module 16, an interface (I/F) module 17 and a communication manager 20 provided for the modules 11 to 17.

The modules 11 to 17 are processing program units for achieving respective particular functions. Each processing program is run by the CPU (not shown in the figure) of the interactive system. Running a processing program causes the various modules 11 to 17 to operate. Each function of these modules 11 to 17 is described next.

The interaction manager module 11 controls the overall flow of system interaction by determining what operation to perform based on information from the user. The speech recognition module 12 recognizes language spoken by the user, and the speech synthesis module 13 outputs information from the system to the user by means of synthetic voice generation. The user operation module 14 handles user input by way of keys, buttons or other manually operated controls.

The display module 15 displays information to the user on a display (not shown). The application module 16 handles such tasks as database searching for providing particular information to the user. The interface module 17 controls a telephone, for example, connected to the interactive system.

A typical use of this interactive system is in conjunction with a navigation system installed in a motor vehicle, in which case it functions as the human-machine interface (HMI) between the navigation system and user. The navigation system is typically connected to the interactive system through the interface module 17, and the application module 16 is written (constructed) to achieve the navigation functions.

The communication manager 20 stores a communication profile (CVP) 21 containing information primarily relating to the interaction manager module 11; a speech recognition profile (SRP) 22 containing information primarily relating to the speech recognition module 12; a speech synthesis profile (SSP) 23 containing information primarily relating to the speech synthesis module 13; a switch profile (SWP) 24 containing information primarily relating to the user operation module 14; an application profile (AP) 25; and a contents profile (CP) 26. The contents profile (CP) 26 contains primarily the display content to be displayed by display module 15. The application profile (AP) 25 contains information primarily relating to the operation of the display module 15, application module 16, and interface module 17. These profiles 21 to 26 are stored at specific addresses in a RAM in the interactive system.

The content of a typical profile in this preferred embodiment is described below. The profile basically contains header information and attribute information. The header information is used primarily for the communication manager 20 to identify each profile when the communication manager 20 needs to access a profile. The header information could therefore contain, for example, the type of system configuration and user name, the corresponding module name or function name. The attribute information includes information required for one module to address another module, such as control parameters and request code, and module state information enabling a profile to address a module 1:1, and operating attributes, that is, other information required for module operation. It should be noted that only the operating attributes are necessarily written in each profile, and the other information may or may not be present.

The content of an exemplary speech recognition profile (SRP) 22 is shown in FIG. 10, for example, and the content of an exemplary speech synthesis profile (SSP) 23 is shown in FIG. 11. A typical switch profile (SWP) 24 is also shown in FIG. 12, an application profile (AP) 25 in FIG. 13, and a contents profile (CP) 26 in FIG. 14.

Data written in modules 21 to 26 are hereafter referred to as "objects." Each object has an object name and setting. The object name is the identifier used for referencing or updating a particular setting. It should be noted that the object type shown in the left column in each of the tables in FIGS. 10 to 14 describes the general type of the object for illustrative purposes herein, and is not information that is actually written in the profile.

As shown in FIG. 10, the speech recognition profile (SRP) 22 contains dictionary information, recognition results, a microphone gain setting recognized speech, and extracted period. As shown in FIG. 11, the speech synthesis profile (SSP) 23 contains the rate of speech, volume, intonation, and speech text data. The speech synthesis module 13 audibly generates the speech text by way of speech synthesis. As shown in FIG. 12, the switch profile (SWP) 24 contains the operation object (which control was operated) and key events. Operations from the user are written as key events. As shown in FIG. 13, the application profile (AP) 25 relates to display presentations, and includes the file name that is displayed and the display area. As shown in FIG. 14, the contents profile (CP) 26 contains the number of displayed items and the text string to be displayed.

While the typical content of the main profiles 22 to 26 is shown in the figures and described, it should be further noted that the operating specifications, content, and implementation of modules 11 to 17 are determined by the information written in the profiles. In addition, profile content enables communication between the modules and determines where related data from the modules is stored.

The modules 11 to 17 thus operate according to the information written in profiles 21 to 26. Information stored as profiles 21 to 26 is thus equivalent to operating information.

Figure 2:
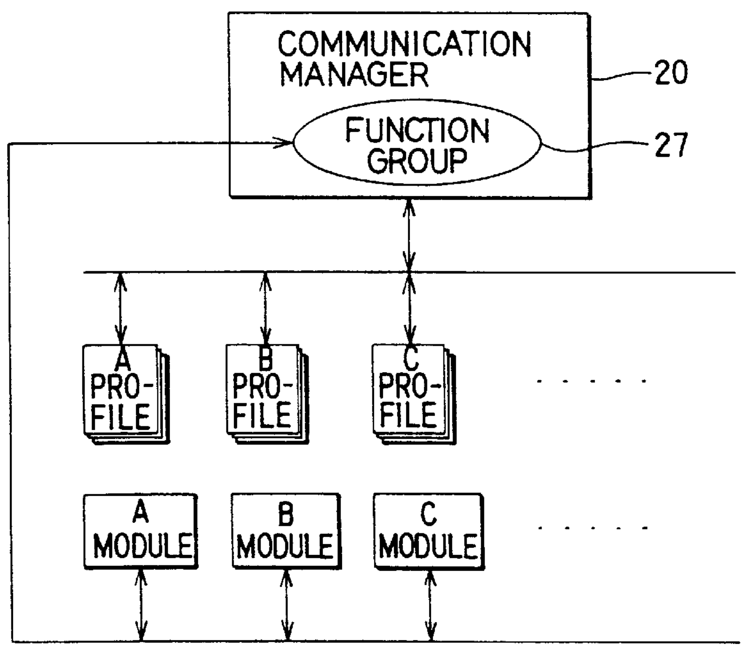
FIG. 2 is a diagram showing the relationship between modules, function group of a communication manager, and profiles in the interactive system.

The communication manager 20 also has a function group 27 enabling the modules 11 to 17 to access the profiles 21 to 26. A typical relationship between the modules 11 to 17 and the profiles 21 to 26 is shown in FIG. 2. As shown in FIG. 2, a module accesses a profile through communication manager 20 by calling a particular function in the function group 27.

The function group 27 specifically has the following functions: an access key fetch function for getting the access key required for a module to access the communication manager 20; an add object function for adding a new object definition to the profile; a delete object function for deleting an object definition from the profile; an update setting function for updating a particular object setting in a profile; a fetch object state function for detecting whether an object setting has been updated; a fetch setting function for getting a particular object setting; an add monitored object function for adding an object to be monitored when the module requests the communication manager 20 to monitor updating a particular object setting; a delete monitored object function for deleting an object to be monitored when the module requests the communication manager 20 to monitor updating a particular object setting; and an interrupt function for interrupting another function when running one function.

These functions enable a module to refer to and update information written in a profile. Furthermore, by enabling objects to be added to a profile and deleted therefrom, these functions also enable system processing to be dynamically changed. Yet further, by telling the communication manager 20 to monitor updating the setting of a particular object, these functions also reduce the number of times a module accesses the communication manager 20.

It should be further noted that this function group 27 is written for the particular operating environment of the modules. For example, if the modules operate in both a native environment and a JAVA environment, the functions are defined to be compatible with both environments.

It should be noted that access privileges defining whether and how a module can access a particular profile can be set in the communication manager 20 for each module. Referring to FIG. 2, for example, access privileges can be set so that a module A can only access a profile A, and a module B can only access a profile B, but a module C can access all the profiles A to C.

Figure 3:
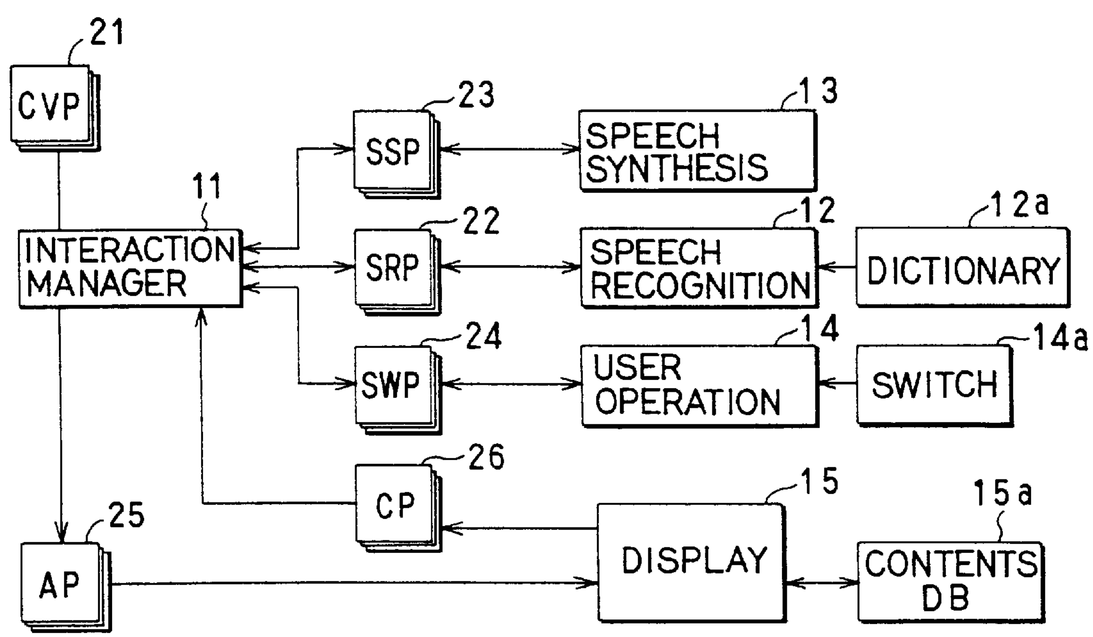
FIG. 3 is a functional diagram showing the relationship between modules and profiles in the interactive system.

As shown in FIG. 3, access privileges are set so that the interaction manager module 11 has access to the speech recognition profile (SRP) 22, the speech synthesis profile (SSP) 23, the switch profile (SWP) 24, the application profile (AP) 25, and the contents profile (CP) 26. Even more specifically, the interaction manager module 11 can both reference and update the speech recognition profile (SRP) 22, the speech synthesis profile (SSP) 23, and the switch profile (SWP) 24, but can only update the application profile (AP) 25, and can only refer to the contents profile (CP) 26.

Furthermore, the display module 15 can only refer to the application n profile (AP) 25, and can only update the contents profile (CP) 26. The speech recognition module 12 can refer to and update the speech recognition profile (SRP) 22. The speech synthesis module 13 can refer to and update the speech synthesis profile (SSP) 23. The user operation module 14 can refer to and update the switch profile (SWP) 24.

Figure 4:
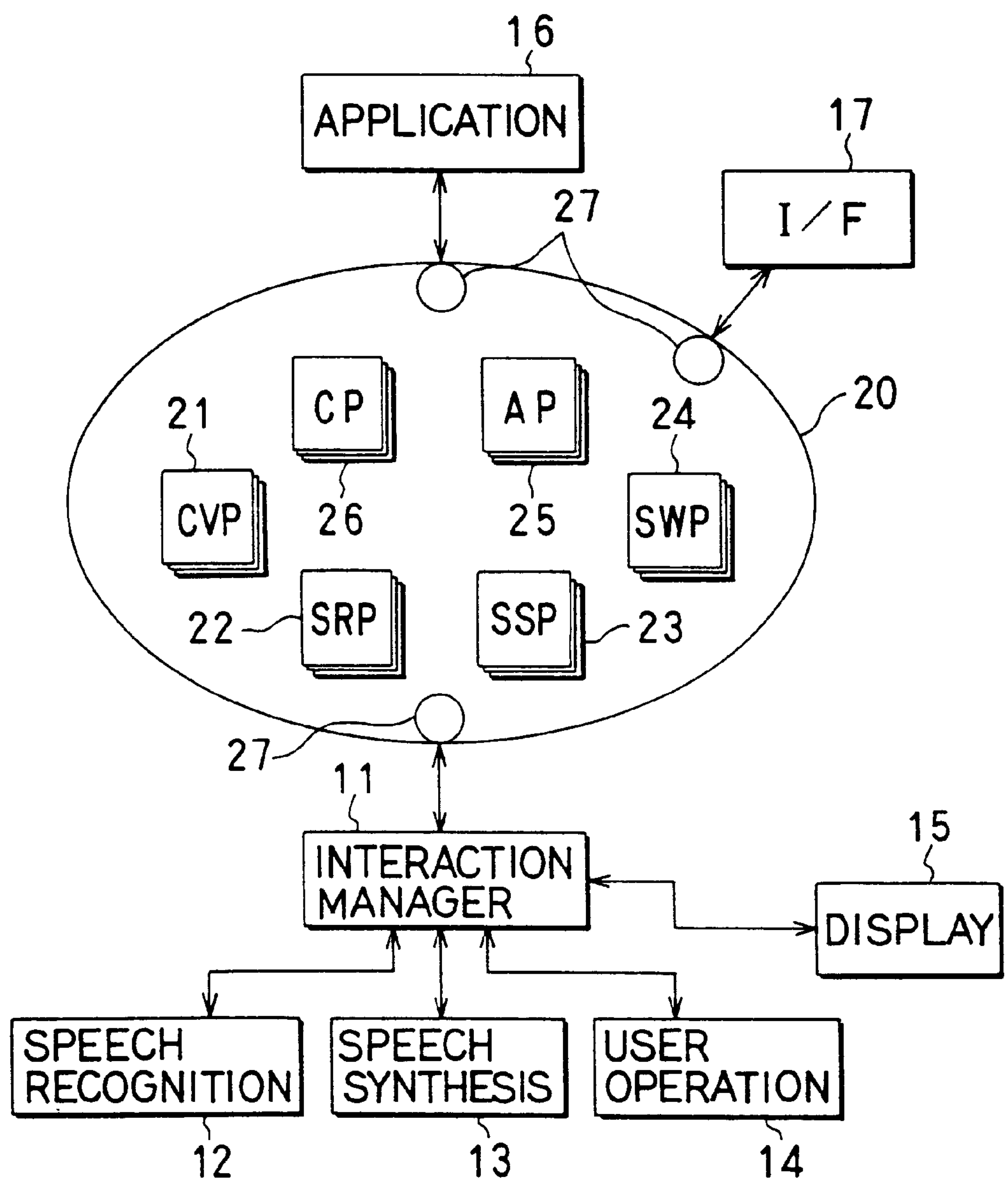
FIG. 4 is an operational organization of the interactive system.

By thus setting the access privileges of modules 11 to 15 with respect to profiles 21 to 26 in the communication manager 20, the speech recognition module 12, the speech synthesis module 13, the user operation module 14, and the display module 15 are operationally put under the management of the interaction manager module 11 in this interactive system as shown in FIG. 4.

For example, the speech synthesis module 13 operates according to the information written in the speech synthesis profile (SSP) 23, but because the interaction manager module 11 can also change the speech synthesis profile (SSP) 23, the speech synthesis module 13 ultimately operates according to instructions from the interaction manager module 11.

The operation of the interactive system according to this preferred embodiment of the invention is described next. It should be noted that the application module 16 and the interface module 17 shown in FIG. 4 can be conceptually located similarly to the display module 15 in FIG. 3. However, to avoid complicating the following description, operation is described using the display module 15 by way of example, and the specific operation of the application module 16 and the interface module 17 is omitted below. FIG. 3 is referred to as needed for the relationship between modules 11 to 15 and the profiles 21 to 26.

The flow diagram in FIG. 5 shows the interaction process of the interaction manager module 11. This interaction process starts when the interaction manager module 11 detects that the setting of a particular object in the communication profile (CVP) 21 has been updated as a result of the user operating a switch or button.

The first step 100 is to initialize settings. A top menu is then displayed at step 110. This step tells the display module 15 to display the first menu for starting interactive processing. More specifically, this step updates the application profile (AP) 25, and the updated application profile (AP) 25 then tells the display module 15 to display the top menu. Display module 15 operation is described in further detail below.

The speech synthesis profile (SSP) 23 is then updated at step 120. This process writes the voice response content of the system in text format (attribute 13 in FIG. 11). The result of this step is a voice response from the speech synthesis module 13.

Figure 6:
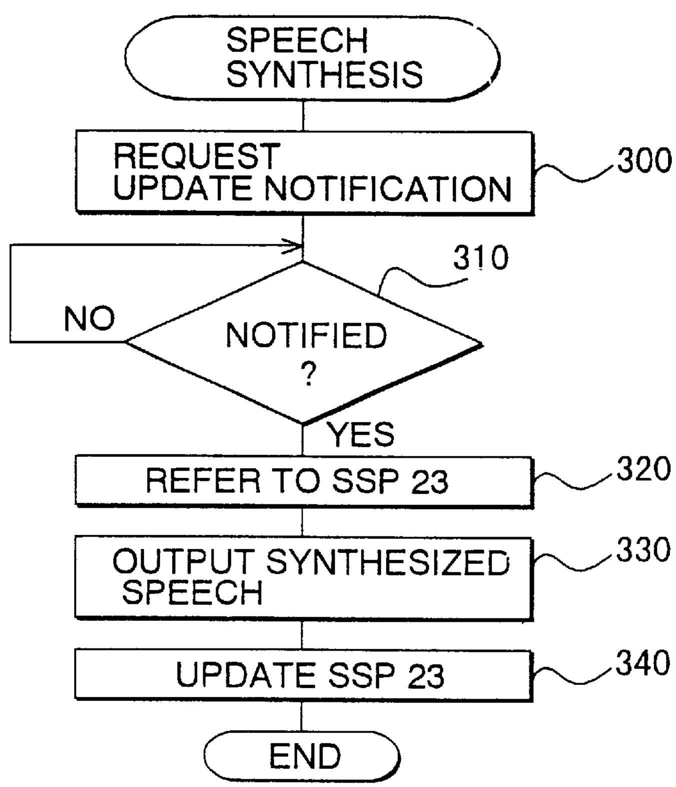
FIG. 6 is a flow diagram showing the operation of a speech synthesis module in the interactive system.

The speech synthesis process of speech synthesis module 13 is described here with reference to the flow diagram in FIG. 6.

When the speech synthesis process starts, the communication manager 20 is requested to monitor a specific object in the speech synthesis profile (SSP) 23. One of these specific objects is a request to monitor whether the speech text (attribute 13 in FIG. 11) was updated. If the setting of the monitored object changes, the communication manager 20 returns a notice to that effect. Therefore, if the speech text content is written in text format at step 120 in FIG. 5, the interaction manager module 11 will be notified by communication manager 20 that the setting of the object being monitored has been updated. It is then detected at step 310 whether a notice has been received from communication manager 20. If a response has been received (YES), the process advances to step 320. Otherwise (NO), step 310 repeats until the notice is received.

The speech synthesis profile (SSP) 23 is then referred to at step 320. Based on the content of speech synthesis profile (SSP) 23, voice response is output at step 330. The speech synthesis profile (SSP) 23 is then updated at step 340, writing primarily information that the system voice response is completed (attribute 6, FIG. 11). The speech synthesis process then ends.

That is, the speech synthesis module 13 operates in a manner linked to the speech synthesis profile (SSP) 23 updated at step 120 in FIG. 5.

Returning to FIG. 5, the contents profile (CP) 26 is referred to at step 130. As noted above, the contents profile (CP) 26 records the content displayed by the display module 15, for example, the number of display items and the text to be displayed. The display content is then interpreted at step 140. Then at step 150, based on the interpreted display content, what information will next be input by the user is predicted, and what interaction to take is determined based on the anticipated result.

The speech recognition vocabulary is then determined at step 160 based on the anticipated result. This process determines the dictionary containing the recognition vocabulary that the speech recognition module 12 will refer to in the speech recognition profile (SRP) 22. That is, the dictionary likely containing the words that will be spoken by the user is selectively written and specified in order to avoid recognition errors.

Input from the user is then awaited at step 170. At this step the communication manager 20 is requested to monitor specific objects in the speech recognition profile (SRP) 22 and switch profile (SWP) 24. This is because the speech recognition profile (SRP) 22 and switch profile (SWP) 24 are updated by the speech recognition module 12 and user operation module 14, respectively, when user input is detected.

Operation of the speech recognition module 12 and user operation module 14 is described next, referring to the speech recognition module 12 and the flow diagram in FIG. 7.

The speech recognition profile (SRP) 22 is first read at step 400, and the dictionary is then set at step 410. This sets the dictionary used for speech recognition based on the dictionary set in the speech recognition profile (SRP) 22 (attributes 7 to 15 in FIG. 10). The dictionary to use is read from speech recognition dictionary 12a shown in FIG. 3. If the dictionary information written in the speech recognition profile (SRP) 22 was changed at step 160 in FIG. 5, the dictionary will be set according to this updated dictionary setting.

Speech recognition is then performed at step 420, and the speech recognition profile (SRP) 22 is updated at step 430. The primary information written in this case is that speech recognition is completed and the recognized words (attributes 6 and 17 to 21 in FIG. 10). This speech recognition process then ends.

User operation module 14 operation is described next with reference to the flow diagram in FIG. 8.

The first step in this process is to read the switch profile (SWP) 24 at step 500. The user operation module 14 operates according to the information written in the switch profile (SWP) 24. Key operation is then detected at step 510. This could include, for example, whether switch 14*a* shown in FIG. 3 was pressed. The switch profile (SWP) 24 is then updated at step 520. Updating the switch profile involves primarily writing the key events determined by which switches or keys were operated (attribute 4 in FIG. 12). The user operation process then ends.

Figure 7:
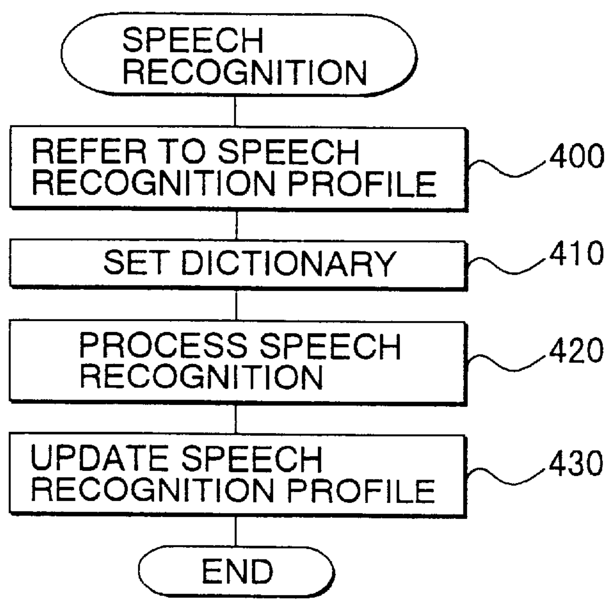
FIG. 7 is a flow diagram showing the operation of a speech recognition module in the interactive system.
Figure 8:
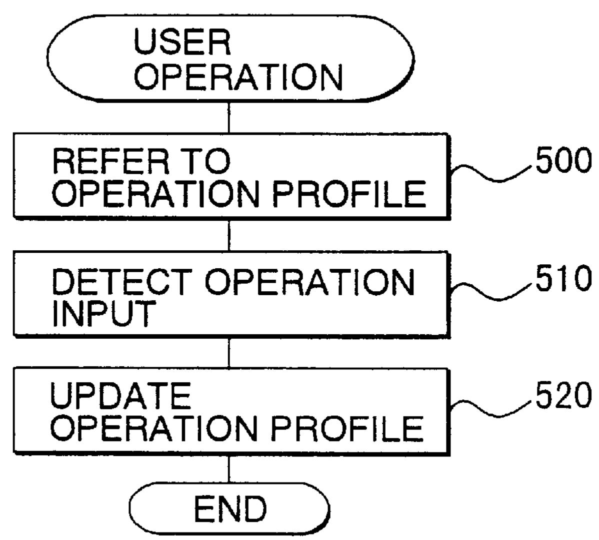
FIG. 8 is a flow diagram showing the operation of a user operation module in the interactive system.

Returning to FIG. 5 again, the speech recognition profile (SRP) 22 and switch profile (SWP) 24 are updated by the speech recognition module 12 and user operation module 14 at step 430 in FIG. 7 and step 520 in FIG. 8. The communication manager 20 then posts notification that the object monitored in the speech recognition profile (SRP) 22 or the switch profile (SWP) 24 has been updated.

It is then checked at step 180 whether there has been any speech input. If the communication manager 20 has posted that the object of the monitored speech recognition profile (SRP) 22 has been updated, step 180 returns YES. Assuming there was speech input and step 180 returns YES, the speech recognition profile (SRP) 22 is referred to at step 190, and processing then passes to step 210. If there was no speech input at step 180 (NO), the switch profile (SWP) 24 is referred to at step 200 before proceeding to step 210.

Information input by the user is then interpreted based on referenced speech recognition profile (SRP) 22 or switch profile (SWP) 24 at step 210. The appropriate operation to perform is then determined based on the interpreted information at step 220. In this case the appropriate information means displaying information based on user input. However, the appropriate operation could be to run a particular application, including, for example, search, route guidance, or audio control. If the interactive system is used for central control of other vehicle systems, the appropriate operation could also include opening or closing windows or turning the lights on.

The application profile (AP) 25 is then updated according to the selected operation at step 230. This process specifies the next display operation by way of application profile (AP) 25. Information is thus displayed on the display device by the display module 15.

Figure 9:
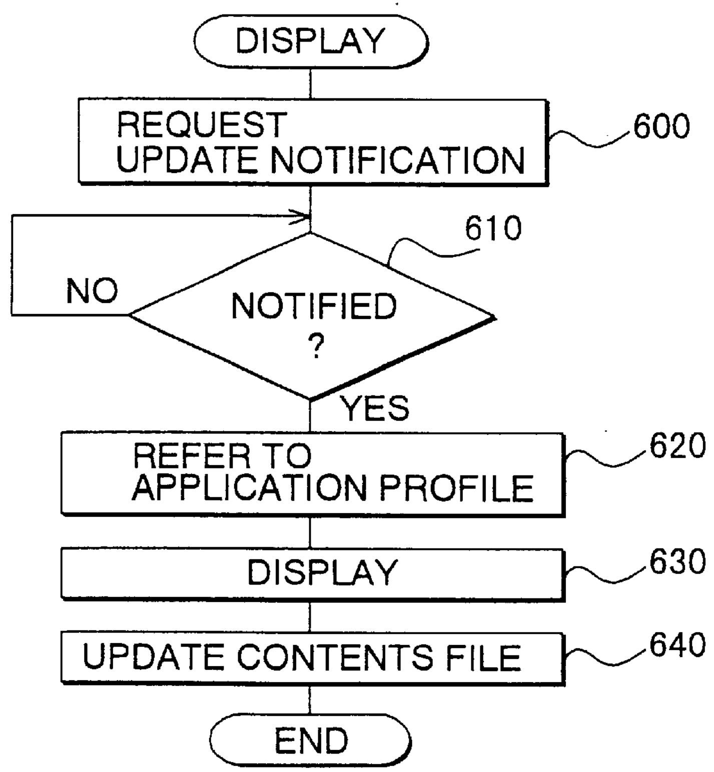
FIG. 9 is a flow diagram showing the operation of a display module in the interactive system.

The display process of the display module 15 is described next with reference to the flow diagram in FIG. 9.

At step 600, the communication manager 20 is requested to monitor a particular object of the application profile (AP) 25. As noted above, this causes the communication manager 20 to post an appropriate notification when the monitored object is updated. The display module 15 therefore waits (NO) to be informed that the object has been updated. When the object has been updated (YES), the procedure advances to step 620.

At step 620 the display module 15 refers to the application profile (AP) 25, and then displays the information determined from the application profile (AP) 25 at step 630. The display information is read from the contents database (DB) 15*a* shown in FIG. 3. The contents profile (CP) 26 is then updated at step 640 by writing such display content information as the number of display items and the display text (attributes 7 to 13 in FIG. 14).

The interaction manager module 11 then determines whether to end the interaction process at step 240 in FIG. 5. This determination is based on the communication profile (CVP) 21. For example, if ending interaction is indicated in the communication profile (CVP) 21 by operation of the application module 16 or interface module 17, step 240 returns YES. If step 240 returns YES to end interaction, the interaction process ends. If step 240 returns NO, the process loops back to step 120 and repeats. As described above, the display module 15 both displays information based on the application profile (AP) 25, and writes the displayed content to the contents profile (CP) 26.

This means that when the process repeats from step 120, the contents profile (CP) 26 is referred to again at step 130, and the display content is interpreted at step 140, the next response can be determined dynamically according to the last interaction at step 150.

With an interactive system according to this preferred embodiment, profiles 21 to 26 recording the information required for linked operation of the modules 11 to 17 are stored in a specific format in the communication manager 20. The modules 11 to 17 therefore operate by referring to these profiles 21 to 26, and dynamically update the contents of the profiles 21 to 26. The modules 11 to 17 then operate by referring to the updated profiles 21 to 26, and in turn update the profiles 21 to 26 based on the outcome. Linked operation of various modules 11 to 17 based on continuously updated profiles 21 to 26 can thus be easily achieved.

An advantage of using the profiles 21 to 26 is that the modules 11 to 17 can be designed with consideration for only the profiles 21 to 26. More specifically, there are no steps in any of the flow diagrams shown in FIGS. 5 to 9 that directly consider the operation of another module. It is therefore not necessary to consider the notification timing of data from any other module 11 to 17 as it is with a conventional design approach, and designing the processing programs of modules 11 to 17 is simple. The processing programs of the individual modules 11 to 17 are therefore independent, and it is simple to modify the modules 11 to 17 and add new modules.

Furthermore, the communication manager 20 does nothing more than manage profiles 21 to 26 in accordance with requests from the modules 11 to 17, and it does not control operations of the modules 11 to 17. The processing program of the communication manager 20 is therefore also simplified. The interactive system according to the present invention can therefore be designed quite easily.

As noted above, the communication manager 20 of the interactive system according to this preferred embodiment is designed so that access privileges can be set to allow individual modules 11 to 17 to access particular profiles 21 to 26 in specific ways. The processing programs of the modules 11 to 17 are therefore not dependent upon any other module, and a hierarchical relationship (master-slave relationship) can be operationally defined among the modules 11 to 17. This also contributes to easier system design.

In this exemplary interactive system, the function group 27 is defined in the communication manager 20, and the modules 11 to 17 access profiles 21 to 26 by calling one of these functions. In addition, the function group 27 is written for the operating environment of the modules. For example, if the modules operate in both a native environment and a JAVA environment, the functions are written for compatibility in both environments. It is therefore not necessary to design the modules 11 to 17 with consideration for the operating environment of the modules. This also helps simplify module design.

Yet further, when requested by the module 11 to 17, the communication manager 20 in this exemplary embodiment notifies the requesting module when the setting of the particular object in the particular profile 21 to 26 has been updated. The interaction manager module 11, the speech synthesis module 13, and the user operation module 14 therefore request the communication manager 20 to monitor the particular object of the profile at step 170 in FIG. 5, step 300 in FIG. 6, and step 600 in FIG. 9, respectively, and check the profile for the updated object value at step 190 and step 200 in FIG. 5, step 320 in FIG. 6, and step 620 in FIG. 9, respectively only when notified by the communication manager 20 that the profile object has been updated. As a result, the modules 11 to 17 do not need to frequently access the communication manager 20 to determine if a particular object value has been changed.

Although the present invention has been described in connection with the preferred embodiments thereof with reference to the accompanying drawings, it is to be noted that various changes and modifications will be apparent to those skilled in the art. For example, the present invention includes any system in which plural system modules operate in a linked fashion. Such changes and modifications are to be understood as included within the scope of the present invention as defined by the appended claims, unless they depart therefrom.

We claim:

1. A multi-module system comprising:

a plurality of modules that are processing units for achieving respective particular functions; and a communication manager provided for the plurality of modules for achieving linked operation of the plurality of modules and for defining whether and how an individual module can access a particular function, wherein the communication manager comprises a memory for storing operating information in a specific format, the operating information being for linked operation of the plurality of modules, an interface enabling access from the plurality of modules, and a processor for accomplishing, based on a request sent from each any of the plurality of modules, through the interface, a referencing process for reading the stored operating information from the memory and passing the operating information to others of the plurality of modules and an updating process for updating the operating information stored in the memory according to the operating information from the any of the plurality of modules, and wherein any of the plurality of modules requests the communication manager to read the operating information by way of the interface, operates according to the operating information provided from the communication manager in response to a read request, and updates the operating information through the interface.

2. The multi-module system as in claim 1, wherein the operating information is stored as a unit of a profile containing information corresponding to each of the plurality of modules.

3. The multi-module system as in claim 2, wherein:

the communication manager is constructed to be capable of setting operating information access privileges for each of the plurality of modules in profile units; and the processor does not perform the referencing process or updating process when requested by a module if the module does not have the access privilege for the operating information to be referenced or updated.

4. The multi-module system as in claim 1, wherein the processor of the communication manager further accomplishes an information update notification process for notifying each of the plurality of modules, in response to a request from the module, that specific information within the operating information has been updated.

5. The multi-module system as in claim 1, wherein the interface is achieved as a function group that is called by the plurality of modules.

6. The multi-module system as in claim 5, wherein the function group is defined according to an operating environment of the plurality of modules.

7. The multi-module system as in claim 1, wherein the plurality of modules include an input module for entering information from a user, an output module for presenting information to the user, and an interaction managing module for managing interaction with the user, so that information is exchanged with the user by means of linked operation of the plurality of modules.

8. The multi-module system as in claim 7, wherein:

the memory of the communication manager stores information content provided to the user as the operating information;

the output module requests updating the operating information through the interface when information is provided to the user so as to store the content of the provided information as the operating information; and the interaction manager module references through the interface the information content stored as the operating information, anticipates information to be input next from the user, and performs an operation according to the anticipated information.

9. The multi-module system as in claim 5, wherein the operating information is stored as a unit of a profile containing information corresponding to each of the plurality of modules and the function group has as plurality of functions comprising:

an access key fetch function for getting an access key required for a module to access the communication manager;

an add object function for adding-a new object definition to the profile;

a delete object function for deleting an object definition from the profile;

an update setting function for updating a particular object setting in the profile;

a fetch object state function for detecting whether an object setting has been updated;

a fetch setting function for getting a particular object setting;

an add monitored object function for adding an object to be monitored when the module requests the communication manager to monitor updating a particular object setting;

a delete monitored object function for deleting an object to be monitored when the module requests the communication manager to monitor updating a particular object setting; and an interrupt function for interrupting another function when running one function.

10. The multi-module system as in claim 9, wherein the communication manager monitors updating the setting of a particular object.

11. The multi-module system as in claim 10, wherein the communication manager posts a notification to the plurality of modules when the monitored object is updated.

* * * * *

UNITED STATES PATENT AND TRADEMARK OFFICE

CERTIFICATE OF CORRECTION

PATENT NO. : 6,708,271 B1
DATED : March 16, 2004
INVENTOR(S) : Mikio Sasaki et al.

It is certified that error appears in the above-identified patent and that said Letters Patent is hereby corrected as shown below:

Title page,
Item [73], Assignee, change from "Assignee: Denso Corporation, Kariya (JP)" to
-- Assignees: Denso Corporation, Kariya (JP) and Denso Create, Inc., Nagoya, (JP) --

Signed and Sealed this

Twenty-second Day of March, 2005

JON W. DUDAS
*Director of the United States Patent and Trademark Office*